Figure 3:
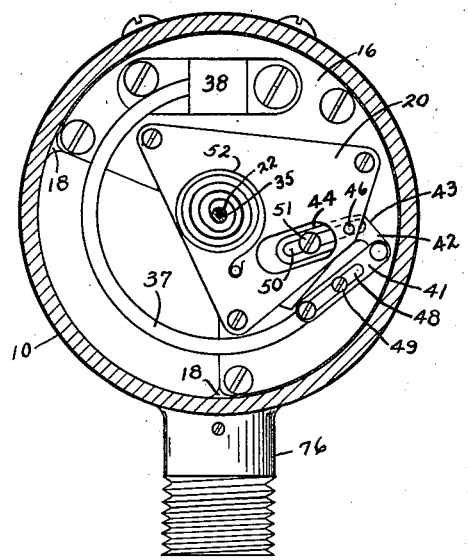

May 11, 1943.  C. D. WALDRON ET AL  2,318,645
HORSEPOWER METER
Filed June 25, 1940  2 Sheets-Sheet 1
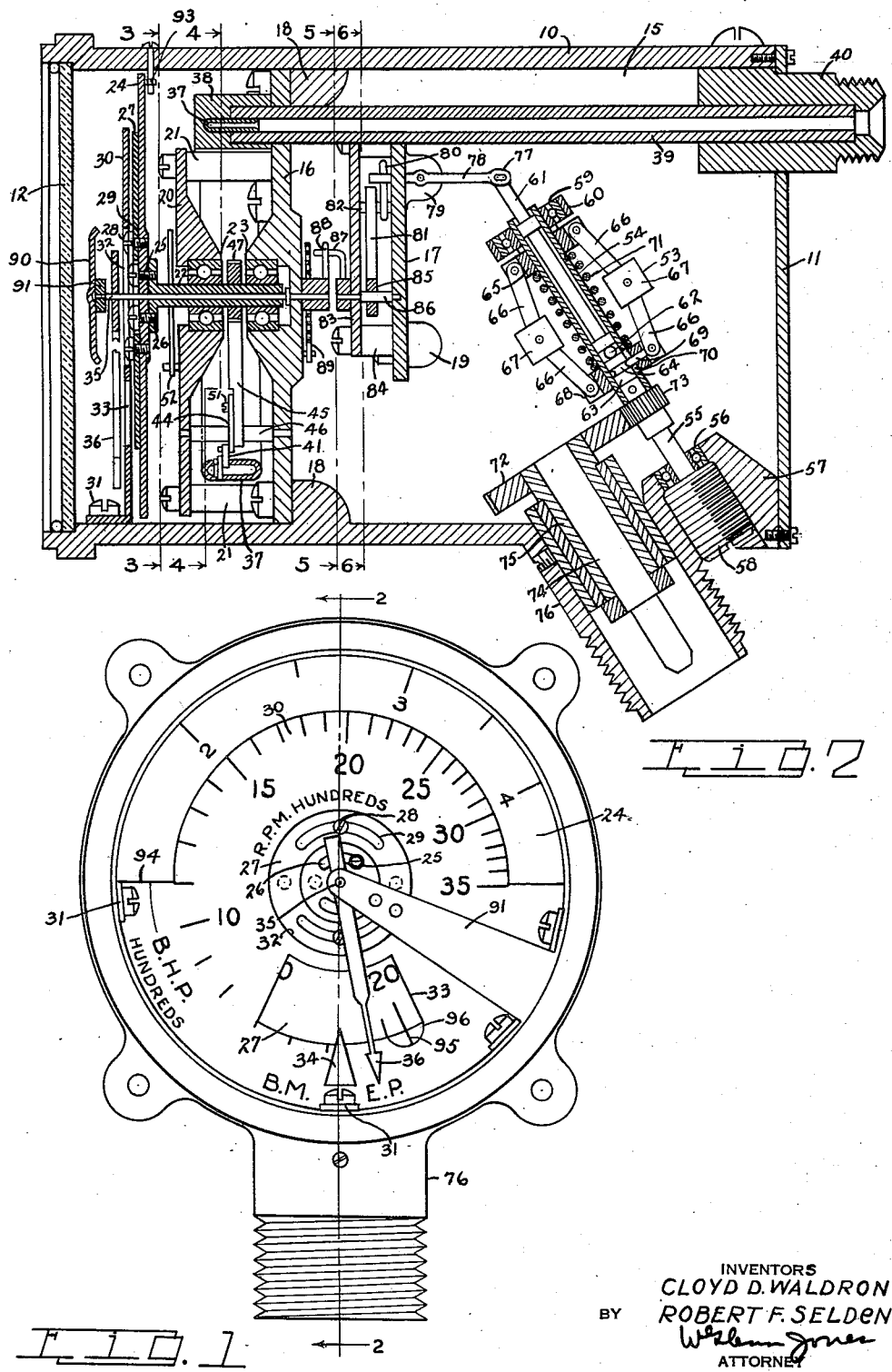
INVENTORS
CLOYD D. WALDRON
ROBERT F. SELDEN
BY
ATTORNEY May 11, 1943.  C. D. WALDRON ET AL  2,318,645
HORSEPOWER METER
Filed June 25, 1940  2 Sheets-Sheet 2

INVENTORS
CLOYD D. WALDRON
BY ROBERT F. SELDEN
ATTORNEY

Patented May 11, 1943

2,318,645

UNITED STATES PATENT OFFICE 2,318,645

HORSEPOWER METER

Cloyd D. Waldron, Newport News, and Robert F. Selden, Hampton, Va.

Application June 25, 1940, Serial No. 342,310

2 Claims. (Cl. 265—26)

(Granted under the act of March 3, 1883, as amended April 30, 1928; 370 O. G. 757)

The present invention relates to meters, and it has a particular relation to meters for indicating the horsepower, revolutions per minute, and brake mean effective pressure developed by an aeronautical internal combustion engine.

One of the objects of this invention is the provision of a horsepower meter of the character described which will correlate the torque and revolutions per minute of the engine in such manner as to indicate the same in terms of the horsepower developed.

Another object of this invention is the provision of a horsepower meter having a dial rotatable in one direction with a motion which is proportional to the logarithm of the torque being transmitted, the dial having graduations thereon in terms of pounds per square inch brake mean effective pressure that are indicated by a stationary pointer; and a cooperating hand which rotates in a direction opposite to that of the dial with a motion which is proportional to the logarithm of the rotative speed of some part of the torque transmitting device in the range where horsepower indications are desired, and with a motion proportional to any desired function of R. P. M. in the speed range in which horsepower indication is not desired, this hand indicating values of engine R. P. M. on a stationary dial; the rotatable dial having graduations thereon in terms of horsepower that are indicated by the position of the speed hand.

A further object of this invention is the provision of a horsepower meter, the mechanism of which is adjustable to accommodate it to engines with different propeller reduction gear ratios, to accommodate it to engines with different displacements; and which includes means for adapting the meter to indicate accurately the horsepower developed by the engine when the meter is subjected to varying barometric pressures of different altitudes.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a front elevational view of a horsepower meter constructed in accordance with the invention, with the nameplate removed;

Fig. 2 is a vertical longitudinal sectional view through the meter taken on line 2—2 of Fig. 1; and Figs. 3, 4, 5 and 6 are vertical transverse sectional views taken on lines 3—3, 4—4, 5—5 and 6—6, respectively, of Fig. 2.

Referring to the drawings, a horsepower meter embodying the invention is shown as comprising a cylindrical casing 10 closed at its rear end by a wall 11 and having a glass front 12. The interior of the casing is provided with spaced front and rear brackets 16 and 17, which are secured to lugs 18 and 19 formed on the interior circumferential surface of the casing. A bracket 20 is mounted on the front bracket 16 in spaced relation thereto by means of posts 21, and together with the bracket 16 forms the support for a tubular shaft 22 journalled in bearings 23 mounted therein.

The forward end of the shaft 22 carries a large dial 24 which is mounted for rotatable adjustment thereon by means of screws 25 passing through arcuate slots 26 provided in the dial, Fig. 1. This dial is graduated to indicate the horsepower developed by the engine and has a smaller dial 27 graduated to indicate engine brake mean effective pressure, adjustably secured thereto by means of screws 28 passing through arcuate slots 29 formed in the smaller dial. The dials 24 and 27 move together when the shaft 22 is rotated and cooperate with a fixed dial 30 secured to the casing 10, as indicated at 31. This dial is provided with a central opening 32 to provide access to the screws 25 and 28 and is also provided with a window 33 through which the graduations on the smaller dial 27 may be observed with relation to a pointer 34 on the fixed dial 30, and through which mark 95 can be observed for setting the relation between dials 24 and 27. The upper portion of the dial 30 is cut away so that the graduations on the horsepower dial 24 may be observed with relation to the pointer 36. Extending through the tubular shaft 22 and mounted for rotation therein is a shaft 35 having a pointer 36 secured to its forward end for cooperation with the graduations on the dials 24 and 30.

The tubular shaft 22 is rotated in order to rotate the horsepower and brake mean effective pressure indicating dials 24 and 27 by means of a Bourdon tube 37, the inlet end of which is fixed in a bracket 38 secured to the front bracket 16 and which communicates through a pipe 39 extending through the brackets 16 and 17 and a screw threaded nipple 40 in the rear wall 11 with suitable piping leading to the oil pressure torque measuring device of the engine.

Figure 4:
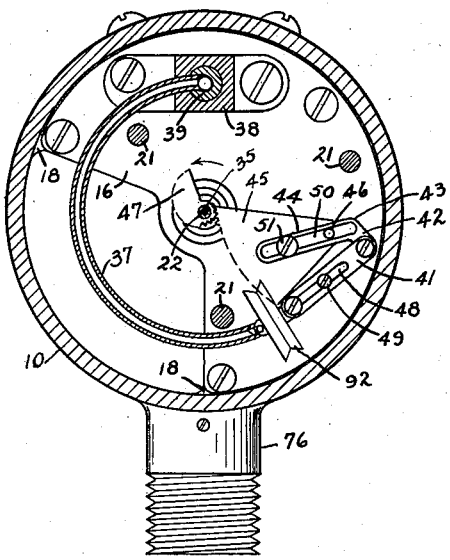
Figure 5:
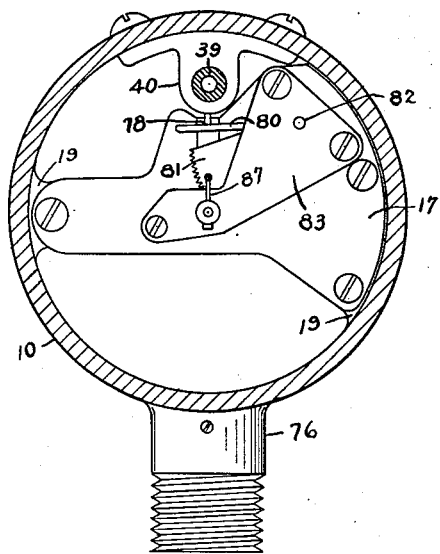
Figure 6:
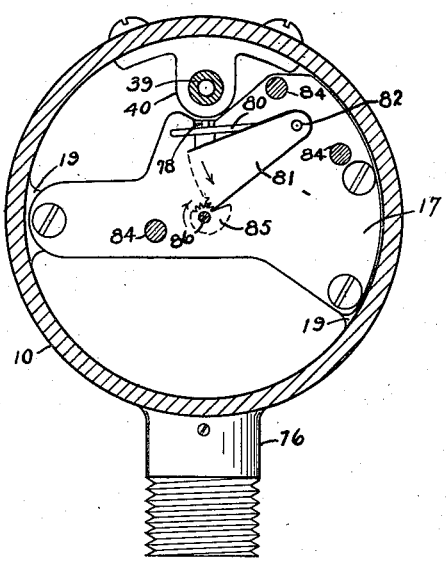

The free or movable end of the Bourdon tube 37, or other pressure sensitive element, is pivotally connected by a link 41 with one leg 42 of a bell crank lever 43, the other leg 44 of which is fixed to a noncircular segmental gear 45, which is mounted on a pivot shaft 46 journalled in the bracket 16 and the bracket 20, Figs. 2 and 4. The segmental gear 45 meshes with and drives a noncircular segmental pinion 47 which is fixed to the tubular shaft 22 between the bearings 23. The link 41 is formed with a slot 48 for pivotal and slidable engagement with a pivot 49 that is rigidly attached to Bourdon tube 37. Thus, when the Bourdon tube expands or contracts, with changes in the oil pressure of the torque measuring device, the link 41 will swing the bell crank lever 43 and noncircular gear 45 about the shaft 46 so as to transmit rotary motion to the shaft 22 and dials 24 and 27. The arc of travel of the noncircular gear 45 may be adjusted to accommodate the instrument to different types of torque measuring devices, by lengthening or shortening the effective lever arm of the leg 44 of the bell crank lever 43. This may be accomplished, as shown in Fig. 4, by providing a slot 50 in the leg 44 for slidable engagement with the pivot shaft 46 and a screw 51 threaded into the noncircular gear 45. The parts may be held in their zero positions by means of a coiled hair spring 52 having one end secured to the bracket 20 and the other end to the tubular shaft 22.

The inner shaft 35 is rotated in order to rotate the pointer 36 relative to the fixed R. P. M. dial 30, by means of a centrifugal or other speed responsive device, conventionally indicated in its entirety at 53, located in the rear of the casing. This device comprises a tubular shaft 54 having a stud shaft 55 fixed in its lower end which is journalled in a bearing 56 mounted in a boss 57 formed on the casing 10. A plug nut 58 is threaded into the boss 57 to provide access to the bearing 55 so as to permit of the easy insertion and removal of this bearing. The upper end of the tubular shaft 54 is journalled in a bearing 59 carried by a bracket 60 formed on the casing 10. A plunger 61 is slidably mounted in the tubular shaft 54 and extends a short distance out of the upper end thereof. The lower end of the plunger 61 engages a ball 62 which in turn engages a slide 63 having a groove 64 formed therein intermediate its ends. A collar 65 is fixed to the upper end of the tubular shaft 54 and is connected by links 66 and centrifugally operable weights 67 with a collar 68 slidably mounted on the lower end of the tubular shaft 54. This collar is provided with a pin 69 which extends through a slot 70 in the tubular shaft for engagement with the groove 64 in the slide 63. A coil spring 71 encircles the tubular shaft 54 between the collars 65 and 68 and tends to urge them apart. Thus, it will be apparent that when the device is rotated the weights 67 in moving outwardly will elevate the lower collar 68 and slide it upwardly along the tubular shaft 54. This will cause the pin 69 to raise the slide 63 while rotating and in turn raise the non-rotating plunger 61. The rotation of the device 53 is effected through the medium of a gear 72 which meshes with a pinion 73 on the stud shaft 55 and which is fixed to a shaft 74 journalled in a bearing 75 mounted in a nipple 76 formed on the casing 10. The shaft 74 is connected in any suitable manner with the engine so as to rotate in response to the speed thereof in the manner of a tachometer.

The upper end of the non-rotating plunger 61 has a slot and pin connection 77 with one end of a lever 78 which is pivotally mounted on an ear 79 provided on the bracket 17. The other end of the lever 78 extends over and engages an arm 80 fixed to a noncircular segmental gear 81 which is fixed to a shaft 82 journalled at its ends in the bracket 17 and a bracket 83 mounted on the bracket 17 in spaced relation thereto by posts 84. The noncircular gear 81 meshes with a noncircular segmental pinion 85 which is fixed to a shaft 86 also journalled in the bracket 17 and the bracket 83. The forward end of the shaft 86 carries an L-shaped arm 87 which engages an arm 88 fixed to the inner end of the pointer shaft 35. Thus, when the plunger 61 is raised, as previously described, the lever 78 will swing the noncircular gear 81 downwardly (in Fig. 6) and rotate the pinion 85 and shaft 86. This will swing the arms 87 and 88 so as to rotate the pointer shaft an amount proportional to a function of the speed of rotation of the engine. The pointer shaft 35 is urged toward its zero position by a coiled hair spring 89, one end of which is fixed to the shaft 35 and the other end fixed to the bracket 16.

The object of the connection 87—88 between the shafts 86 and 35 is not only to permit of slight misalignment of these shafts in assembly without causing the pointer shaft to bind, but also to permit the arms to be offset angularly relative to one another when the parts occupy their zero positions. This prevents the meter from functioning at low engine speeds. A nameplate 90 is fixed to a bracket arm 91 carried by the casing 10 and covers the access openings in the dials 24 and 27. The arm 91 also forms a forward support for the pointer shaft 35.

A Sylphon bellows device or aneroid capsule 92 may be connected between the end of the Bourdon tube 37 and the link 41 so as to compensate for variations in atmospheric pressures at different altitudes in cases in which the torque measuring device gives an absolute pressure instead of a gauge pressure that is proportional to torque. (Present devices give gauge pressure.)

The noncircular gears 45 and 47 are so designed that the approximate linear motion of the Bourdon tube 37 is converted into a logarithmic rotary motion of the noncircular segmental pinion 47. Also, the noncircular gears 81 and 85 are so designed that the approximate linear motion of the gear 81 changes to exactly a logarithmic rotation of the gear 85 in the range of R. P. M. in which horsepower is to be indicated. At low R. P. M at which it is not desired to indicate horsepower the rotation of gear 85 does not have to be logarithmic with R. P. M., but can be any desired motion. This increases the smallest radial dimensions of gear 85, and also compresses the R. P. M. scale in the range below that at which horsepower is desired.

Instead of noncircular segmental gears 45, 47, 81, and 85 it is possible in some instances to use noncircular segmental cams that roll together without sliding or a cam and tape or a cam and chain mechanism.

The pressure-actuated mechanism of the meter can be compensated for temperature variation by means of a bi-metallic strip, by proper choice or working of materials, or by any other means desired.

The noncircular gears or cams and other parts can be properly balanced so as to eliminate the effect of linear accelerations of the meter.

The danger zones of the scales can be marked with distinguishing colors, if desired.

The dial 24 is held against a stop 93 during low values of torque, and allowed to make approximately one-half revolution in the range of torque above a specified value. This will require one row of horsepower values plotted logarithmically around the circumference of the dial. Having the dial turn only one-half revolution, covering the lower half of the dial, and eliminating the lower range of horsepower values eliminate having two rows of horsepower values around the dial, thus preventing the confusion of deciding which row of horsepower values to read.

The dial 27 adjustably mounted on the dial 24 can be calibrated in terms of propeller reduction gear ratio, or in numbers that can be referred to in a chart, prepared by the instrument manufacturer to cover all engine models for which the power range of the instrument is suitable.

The adjustment for propeller reduction gear ratio that is made between dial 24 and shaft 22 can be made by removing dial stop 93 and with shaft 22 in some specified position set some specified value of horsepower on dial 24 at the edge 94 of dial 30. A chart can show what value of horsepower must be set at 94 to correspond to any desired propeller reduction gear ratio.

The adjustment between dials 24 and 27 can be made by line 95 on dial 24 that shows under the enlargement 96 of window 33. Setting the proper value of B. M. E. P. on dial 27 at mark 95 adjusts the B. M. E. P. scale for any desired engine displacement.

On the stationary dial 30 that covers part of dial 24 is an R. P. M. scale composed of values of R. P. M. that are indicated by the tachometer pointer 36. These values of R. P. M. are laid out logarithmically in the range of R. P. M. in which it is desired to indicate horsepower, and are laid out linearly or otherwise in the range of R. P. M. below that at which horsepower is desired.

*Laying out R. P. M. and horsepower scales*

Assume a meter to be laid out for an engine that develops 1,500 horsepower at 2,700 R. P. M. Maximum torque will be 2,915 pound-feet.

Assume arbitrarily that the tachometer is to indicate engine speeds of 400 to 3,500 R. P. M.

The steps to be followed in laying out the R. P. M. and horsepower scales are: First, lay out 400 to 3,500 R. P. M. on any desired part of the circumference of the stationary R. P. M. scale, the circumferential distance to each value of R. P. M. being proportional to the logarithm of each value of R. P. M. The mock-up meter shows 400 to 3,500 R. P. M. laid out on about seven-eighths of the circumference of the R. P. M. scale.

Gears 81 and 85 must be so designed that the tachometer hand motion follows this R. P. M. scale.

Second, lay out the values of horsepower on the torque dial, the angular distance for any given number of horsepower on the dial being the same as the angular distance for this same number of R. P. M. on the R. P. M. scale. For example, take the attached mock-up meter and turn the dial until 1,500 horsepower is at 1,500 R. P. M. It will be seen that 1,400, 1,300, 1,200, and 1,100 horsepower are at 1,400, 1,300, 1,200, and 1,100 R. P. M., respectively. Thus, any desired horsepower scale can be laid out from the R. P. M. scale.

Gears 45 and 47 must be designed so that the dial rotates as though the values of horsepower were values of torque, 1,500 horsepower corresponding to 2,915 pound-feet of torque, and 1,000 horsepower corresponding to $$1000/1500 \times 2,915 = 1,940$$

pound-feet of torque, etc. The dial rotates an angular distance equal to that between 1,000 horsepower and 1,500 horsepower when torque changes from 1,940 pound-feet to 2,915 pound-feet.

The dial of the meter does not move below values of torque at which 1,500 horsepower numbers would appear at the left side of the meter, or below values of torque at which 147 horsepower is developed at 1100 R. P. M. This means that the torque dial rotates from the position at which 360 horsepower on the dial is at 2,700 R. P. M. on the R. P. M. scale, to the position at which 1,500 horsepower is at 2,700 R. P. M., or from values of torque of $$360/1500 \times 2,915 = 700$$

pound-feet to 2,915 pound-feet.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and/or used by or for the Government of the United States of America for governmental purposes without the payment of any royalties thereon or therefor.

What is claimed is:

1. A horsepower meter comprising a rotatable dial having graduations thereon indicating horsepower; non-circular intermeshing gears for rotating said dial; means responsive to the torque of the engine for rotating said gears, the curvature of said gears being such as to rotate said dial with a motion proportional to the logarithm of the torque being transmitted; a pointer cooperating with the graduations on said dial; non-circular intermeshing gears for rotating said pointer in a direction opposite to that of said dial; means responsive to the speed of the engine for rotating said last mentioned gears, the curvature of said last mentioned gears being such as to rotate said pointer with a motion proportional to the logarithm of the rotative speed of the engine, means for adjusting the degree of angular travel of said rotatable dial in accordance with the torque developed by the engine, and a lost motion connection between said speed responsive means and said pointer for delaying the movement of the latter during low engine speeds.

2. A horsepower meter comprising a rotatable dial having graduations thereon indicating horsepower; non-circular intermeshing gears for rotating said dial; means responsive to the torque of the engine for rotating said gears, the curvature of said gears being such as to rotate said dial with a motion proportional to the logarithm of the torque being transmitted; a pointer cooperating with the graduations on said dial; noncircular intermeshing gears for rotating said pointer in a direction opposite to that of said dial; means responsive to the speed of the engine for rotating said last mentioned gears, the curvature of said last mentioned gears being such as to rotate said pointer with a motion proportional to the logarithm of the rotative speed of the engine, and means for adjusting the degree of angular travel of said rotatable dial in accordance with the torque developed by the engine, a lost motion connection between said speed responsive means and said pointer for delaying the movement of the latter during low engine speeds, and an aneroid capsule connected between said torque responsive means and said first mentioned gears for controlling the rotation of said dial with changes in altitude.

CLOYD D. WALDRON.
ROBERT F. SELDEN.